（12）United States Patent
Hiltunen et al.

(10) Patent No.: US 8,515,353 B2
(45) Date of Patent: Aug. 20, 2013

(54) METHOD AND ARRANGEMENT IN A RADIO BASE STATION, IN A RADIO COMMUNICATIONS NETWORK

(75) Inventors: Kimmo Hiltunen, Esbo (FI); Tomas Nylander, Varmdo (SE); Hakan Olofsson, Stockholm (SE); Jari Vikberg, Jarna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 212 days.

(21) Appl. No.: 13/120,094

(22) PCT Filed: Sep. 17, 2009

(86) PCT No.: PCT/SE2009/051040
§ 371 (c)(1),
(2), (4) Date: Mar. 21, 2011

(87) PCT Pub. No.: WO2010/036188
PCT Pub. Date: Apr. 1, 2010

(65) Prior Publication Data
US 2011/0237244 A1    Sep. 29, 2011

Related U.S. Application Data

(60) Provisional application No. 61/101,019, filed on Sep. 29, 2008.

(51) Int. Cl.
H04B 1/00        (2006.01)
H04B 15/00      (2006.01)

(52) U.S. Cl.
USPC ....... 455/63.1; 455/67.11; 455/41.2; 455/444

(58) Field of Classification Search
USPC .................. 455/63.1, 67.11, 423, 444, 41.2
See application file for complete search history.

(56) References Cited

U.S. PATENT DOCUMENTS

2008/0146154 A1    6/2008    Claussen et al.

FOREIGN PATENT DOCUMENTS

WO    WO 2007/119133    10/2007
WO    WO 2008/093100    8/2008

OTHER PUBLICATIONS

European Communication Corresponding to European Patent Application No. 09 788 607.1; Dated: Aug. 13, 2012; 4 Pages.
International Search Report for PCT/SE2009/051040, Dec. 11, 2009.

*Primary Examiner* — Lewis West
(74) *Attorney, Agent, or Firm* — Myers Bigel Sibley & Sajovec

(57) ABSTRACT

The invention relates to an arrangement (900) in a first radio base station (20) for decreasing interference of a user equipment (10) present in a first cell (25) towards a second radio base station (21, 40, 140), which first radio base station (20) and the second radio base station (21, 40, 140) are comprised in a radio communications network and the first radio base station (20) serves the first cell (25) and the second radio base station (21, 40, 140) serves a second cell (26, 42, 142). The arrangement (900) comprises a receiving unit (901) configured to receive data, which data is associated with the second radio base station (21, 40, 140). Furthermore, the arrangement (900) comprises an estimating unit (902) arranged to estimate uplink interference of the user equipment (10) towards the second radio base station (21, 40,140) based on the received data, a calculating unit (903) arranged to calculate a maximum allowed user equipment transmission power of the user equipment (10) from the estimated uplink interference, and a signalling unit (904) configured to signal the maximum allowed user equipment transmission power to the user equipment (10), which maximum allowed user equipment transmission power is arranged to limit a transmission power used by the user equipment (10).

18 Claims, 9 Drawing Sheets

METHOD AND ARRANGEMENT IN A RADIO BASE STATION, IN A RADIO COMMUNICATIONS NETWORK

CROSS-REFERENCE TO RELATED APPLICATIONS

This application is a 35 U.S.C. §371 national stage application of PCT International Application No. PCT/SE2009/051040, filed on Sep. 17, 2009, which claims priority from U.S. Provisional Patent Application No. 61/101,019, filed on Sep. 29, 2008, the disclosures and contents of which are incorporated by reference herein in their entireties. The above-referenced PCT International Application was published in the English language as International Publication No. WO 2010/036188 on Apr. 1, 2010.

TECHNICAL FIELD

The invention relates to a method and an arrangement in a first radio base station. In particular, the invention relates to decrease interference of a user equipment towards a second radio base station in a radio communications network.

BACKGROUND

There is today ongoing work in the radio communication area for providing home and/or small area coverage for a limited number of users using a small base station, a Femto radio base station, commonly called a Femto NodeB for Wideband Code Division Multiple Access (WCDMA) or Femto eNodeB (Evolved UMTS Terrestrial Radio Access Network (E-UTRAN) NodeB) for Long Term Evolution (LTE). Other common names are Home NodeB (HNB) for WCDMA or Home eNodeB (HeNB) for LTE.

This Femto radio base station would provide normal LTE/WCDMA coverage for the end users, a so called femto cell, and would be connected to the network using some kind of IP based transmission. One alternative is to use fixed broadband access, e.g. Digital Subscriber Line (xDSL) or Cable, to connect the Femto node to the network.

There are discussions to change the architecture for WCDMA from traditional architecture towards a flat architecture. However this does not change the system solution characteristics and behavior outlined below. For the flat architecture the Femto radio base station and Radio Network Controller (RNC) can be seen as logical entities in the Femto radio base station.

There are several ways to use the available frequencies between the femto layer and the traditional cellular deployment layer, which layer in this document is referred to as 'macro' layer even though it may comprise both macro, micro and pico cells. There are three Channel Deployment Scenarios (CDS) that are relevant, namely:

CDS1: One frequency used both by the Femto radio base stations and the Macro radio base station. This CDS has some severe interference problems that will make it hard to work.

CDS2: One dedicated frequency used only by the Femto radio base stations and at least another frequency used only by the Macro radio base stations. This CDS could be the preferred one if only technical arguments are taken into account. However, it is very unlikely that operators are willing to dedicate whole frequencies for the femto layer, mostly due to economical reasons.

CDS3: One frequency used both by the Femto radio base stations and the Macro radio base stations and at least another frequency used only by the Macro radio base stations.

CDS3 is expected to be a common way for deployments. However, also this deployment can cause different types of interference in certain scenarios.

It is also assumed that Femto radio base stations belonging to one operator will typically be operating on one carrier/frequency.

A number Primary Scrambling Codes (PSC) is assumed to be allocated to the femto layer, e.g. ten PSCs. These PSCs are configured in the cell neighbor lists on the macro layer, and signaled to macro layer user equipments for their idle mode cell selection. One of these PSCs is automatically assigned to each Femto radio base station at start up.

A number of Location Areas (LA) is assumed to be allocated to the femto layer, e.g. ten LAs. One of these LAs is automatically assigned to each Femto radio base station at start up.

A Femto radio base station scans and reports found cells both macro and femto cells of any Radio Access Technology (RAT) to a network node, e.g. a logical RNC, concentrator node or another network node for example an Operation & Maintenance (O&M) node. The reported data includes, in the example of UMTS, for each detected UMTS Terrestrial Radio Access Network (UTRAN) cell:

1. PSC,
2. frequency e.g. UTRA Absolute Radio Frequency Channel Number (UARFCN),
3. relevant parts of system information, e.g. Location Area Identifier (LAI), Routing Area Code (RAC), Cell-ID, Common Pilot Channel (CPICH) output power, and
4. signal strength measurement report.

The network node, e.g. the (logical) RNC builds the neighbor list for a Femto radio base station, and includes the heard macro cells and the allocated femto PSCs in the neighbor list. The list is signaled to User Equipments (UEs) connected to the Femto radio base station for use in cell selection and cell reselection.

Femto radio base station 'access control' is based on a forbidden LAI list in the user equipment, i.e. LAI list in user equipment updated with the use of Location Update Reject.

For CDS3, the femto cells would for example reuse one of the two frequencies used in the macro cells. In a flat architecture for WCDMA, the radio base station and the RNC are collapsed to form one node, a Femto radio base station. In some documentation the resulting node is called NodeR&B (NodeB RNC and Radio base station) and also as a Combined RBS/RNC. However there might be a mix of traditional architecture and flat architecture nodes in a network in both the femto and macro layers.

Problems with existing solutions are described for a WCDMA embodiment. However, similar problems exist in the LTE network or other radio access technologies where user equipments of a Femto radio base station interfere with radio base stations or other Femto radio base stations. If frequencies are used according to CDS3 or similarly, as explained above, interference will occur in certain scenarios.

SUMMARY

An object of embodiments herein is to provide a radio base station and a method to reduce the uplink interference towards a second radio base station.

In order to achieve the object a method in a first radio base station is provided. The method is for decreasing interference of a user equipment present in a first cell towards a second radio base station. The first radio base station and the second radio base station are comprised in a radio communications network. The first cell is served by the first radio base station and the second radio base station serves a second cell.

The first radio base station receives data, which data is associated with the second radio base station. For example, the first radio base station may receive a C-PICH signal from the second radio base station and/or a RSCP measurement, of a C-PICH signal from the second radio base station, from the user equipment.

The first radio base station estimates uplink interference of the user equipment towards the second radio base station based on the received data.

The first radio base station also calculates a maximum allowed user equipment transmission power of the user equipment based on the estimated uplink interference.

Furthermore, the first radio base station signals the maximum allowed user equipment transmission power to the user equipment. The maximum allowed user equipment transmission power limits a transmission power used by the user equipment.

In some embodiments a Femto radio base station estimates pathlosses to a neighboring radio base stations, and then calculates a maximum user equipment transmission power to be used in that femto cell. This is signaled to the user equipments in the femto cell.

In order to perform the method an arrangement in the first radio station is provided. The arrangement comprises a receiving unit configured to receive data, which data is associated with the second radio base station. The arrangement further comprises an estimating unit arranged to estimate uplink interference of the user equipment towards the second radio base station based on the received data. The arrangement also comprises a calculating unit arranged to calculate the maximum allowed user equipment transmission power of the user equipment based on the estimated uplink interference. In addition, the arrangement comprises a signalling unit configured too signal the maximum allowed user equipment transmission power to the user equipment.

Hence, it will be possible to minimize uplink interference from user equipments towards neighboring cells. Embodiments herein also propose different ways to estimate the uplink interference. A first way is to set-up maximum allowed user equipment transmission power based only on measurements performed by the first radio base station. A second way is to fine-tune the maximum allowed user equipment transmission power during the operation of the first cell with the help of measurement reports received from the served user equipment or user equipments. In some embodiments, these different methods may be combined into a two-step approach to limit the uplink interference, wherein the first way is initially performed and the second way is used to fine tune the maximum allowed user equipment transmission power. As a result of the fine-tuning step, the algorithm adapts to actual radio base station deployment scenario, and hence, minimizes a) interference towards neighboring cells and b) unnecessary impact on user equipment uplink performance in the first cell.

BRIEF DESCRIPTION OF THE DRAWINGS

Embodiments will now be described in more detail in relation to the enclosed drawings, in which.

DETAILED DESCRIPTION

Figure 1:
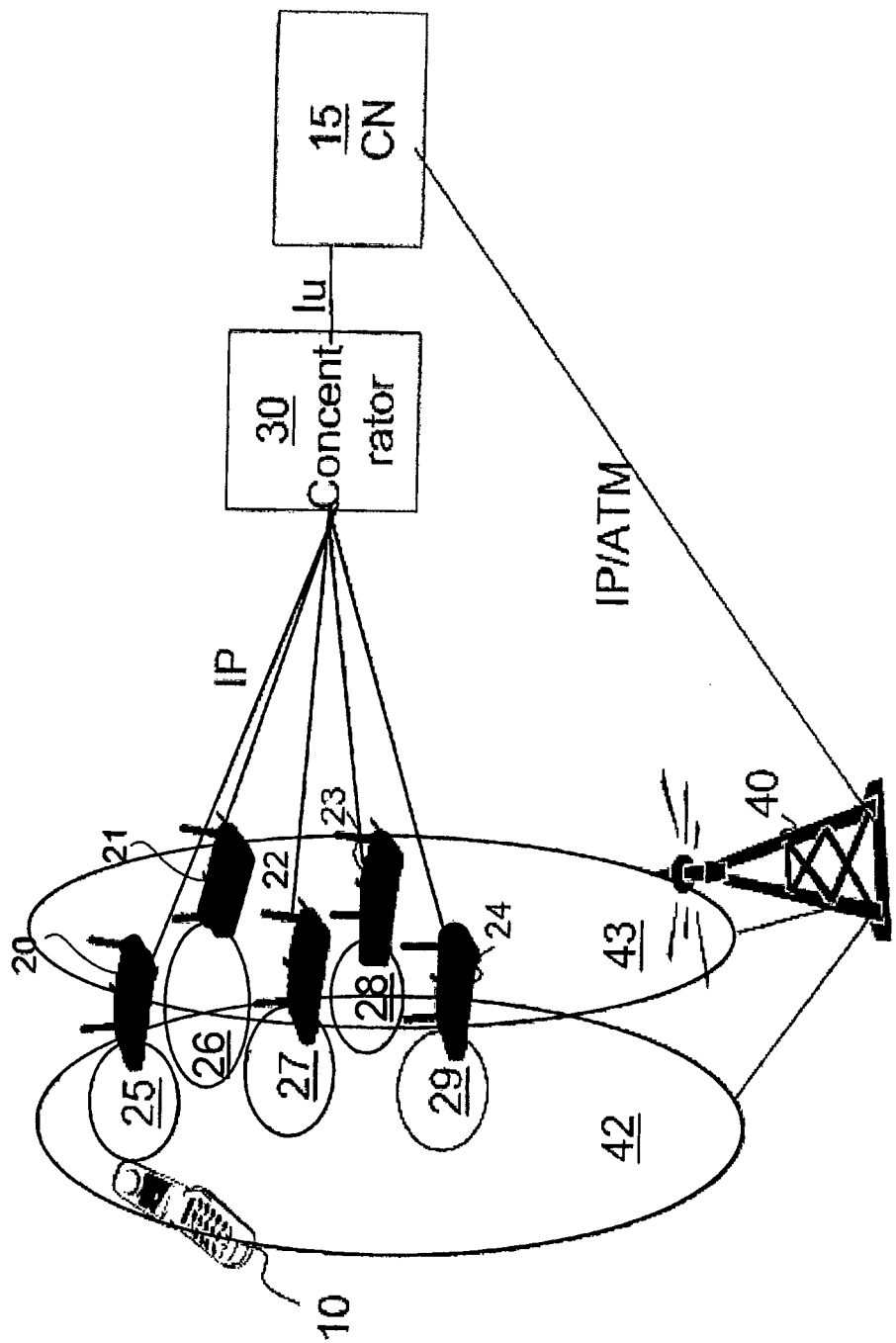
FIG. 1 is a schematic diagram of a radio communications network.

FIG. 1 shows an example of a WCDMA network with both femto and macro cells. The illustrated example discloses a user equipment (UE) 10 arranged to be connected to a core network (CN) 15. A number of first radio base stations, referred to as Femto radio base stations 20-24 herein below, are disclosed. Each Femto radio base station 20-24 may serve a femto cell 25-29 through which user equipment 10 may be connected to the CN 15. The Femto radio base stations 20-24 may be connected to a concentrator node 30 arranged to proxy the Femto radio base stations 20-24 toward the CN 15.

Furthermore, the radio telecommunications system may further comprise at least one second radio base station, denoted as NodeB 40 in FIG. 1, serving for example, macro cells 42, 43. The macro cells 42, 43 are overlaying the femto cells 25-29. The user equipment 10 may also use the macro cells 42, 43 to connect to the CN 15. The Femto radio base stations 20-24 and the NodeB 40 may be represented as a combined radio base station and Radio Network Controller (RNC).

In a different architecture, wherein the Femto radio base stations 20-24 and the NodeB 40 does not comprise a combined radio base station and RNC, the Femto radio base stations 20-24 and the NodeB 40 may be connected to a Radio Network Controller (RNC) instead of a concentrator node 30.

In an example for cell deployment CDS3, the femto cell 25 would for example use a first frequency, thus, reusing one of the two frequencies used in the macro cells 42,43. Hence, there is a risk that the user equipment 10 may interfere with NodeB 40.

In the present solution, the user equipment 10 is regulated to a maximum allowed user equipment transmission power from a Femto radio base station 20 to reduce the interference. This is based on an estimate of uplink (UL) interference from the user equipment 10/Femto radio base station 20 towards the NodeB 40.

Figure 2:
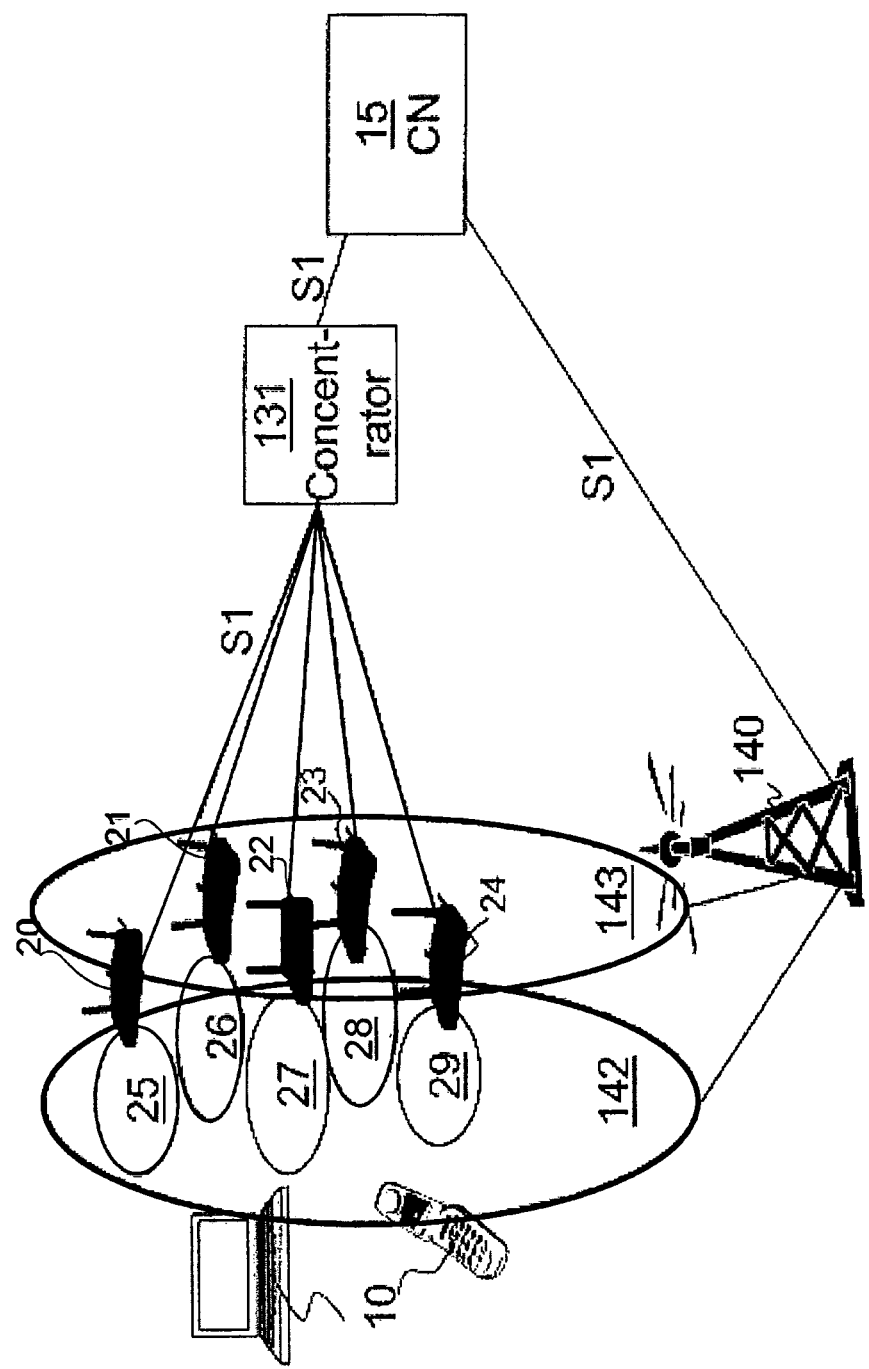
FIG. 2 is a schematic diagram of a radio communications network.

FIG. 2 shows an example of a LTE network with both femto- and macro cells. The illustrated example discloses the user equipment 10 arranged to be connected to the CN 15. A number of Femto radio base stations 20-24 are disclosed wherein each Femto radio base station 20-24 serves a femto cell 25-29 through which user equipment 10 may be connected to the CN 15. The Femto radio base stations 20-24 are connected to the CN 15 either directly or via a concentrator node 131, the latter option shown in FIG. 2.

Furthermore, the radio telecommunications system further comprises at least one second radio base station, in FIG. 2 denoted as macro radio base station eNodeB 140 serving for example, macro cells 142, 143. The macro cells 142, 143 may be overlaying the femto cells 25-29. The user equipment 10 may also use the macro cells to connect to the CN 15 over S1 interface.

The concentrator node 131 is a node that is needed e.g. due to the large amount of S1 interfaces i.e. to hide the possibly very high number of Femto radio base stations from the Core Network (CN) 15. In the WCDMA network case in FIG. 2, a specific Iuh interface has been defined between the Femto radio base station 20-24 and the concentrator node 30. Even in this case, the normal Iu interface is used between the concentrator node 30 and the CN 15.

The LTE architecture is relatively similar to the flat architecture for WCDMA. There is no node similar to the RNC in the LTE architecture. This means that the eNodeB 140 is directly connected to the CN 15 i.e. in a similar way as in the flat architecture for WCDMA.

It is likely that also for LTE a concentrator node 131 will be needed due to the large amount of S1 interfaces i.e. to hide the possibly very high number of Femto radio base stations from the CN 15. As stated above, there is a risk that the user equipment 10 is interfering with the eNodeB 140. In the illustrated example, the user equipment 10 is regulated to a maximum allowed user equipment transmission power from a Femto radio base station 20. This is based on an estimate of uplink (UL) interference, estimated from a measurement of the user equipment 10 towards the eNodeB 140 or a measurement from the Femto radio base station 20 on an eNodeB 140 signal. Thus, the interference towards eNodeB 40 is reduced.

As a part of the solution a problem is first identified and discussed. In a network without femto cells, the logical serving RNC controlling the source cell would possibly try to perform soft handover if measurement reports from the user equipment 10 indicate a better serving cell. That is, to add a leg to the new radio base station controlling the detected cell. Soft handover enables also power control of the user equipment power versus both the serving and the target/victim cell.

However, handover would normally not be allowed between femto cells as these normally would belong to different end users, as in this case, and access control would prevent a neighbor to use a neighbor's femto. Furthermore, femto/macro soft handover is typically not supported as it is assumed that the Iur-interface is not supported for femto cells. Another reason to avoid soft handover between femto and macro is to keep the number of connections towards the macro cell, soft handover overhead, sufficiently low. By doing so, the macro cell downlink will not be unnecessarily loaded by the possibly large amounts of femto user equipments.

Moreover, there are some technical challenges related to femto cells and soft handover which results in that soft handover between femto cells is typically not supported in WCDMA. The total number of different WCDMA Primary Scrambling Codes (PSC) is limited to 512. As the number of femto cells in a network is estimated from tens of thousands up to millions, there is even wider reuse need of PSCs in the femto layer than in the macro layer. One working assumption is that a limited number of PSCs, for example 10, is dedicated for the femto layer and reused between the different femto cells. These PSCs are normally not defined in the femto cells as "idle or active mode neighbor cells".

The high number of the femto cells and the fact that these may be installed by the end users themselves without any intervention or planning by the operator personnel means that it is not possible to uniquely identify a femto cell. If the user equipment 10 would start including the femto cells in the active/connected mode measurement reports i.e. that the femto cells are also added to the Monitored Set in the user equipment 10$i$, it would still be impossible for the Serving Femto RNC to uniquely identify the correct femto cell to trigger e.g. soft handover signaling towards that Femto RNC and cell. For this reason, it is not very likely that the femto cells are included in the active/connected mode neighbor cell lists of the femto cells for mobility reasons i.e. as handover between femto cells is likely not supported. However, a central part of the technique disclosed herein is to include the PSCs allocated for femto cells in the active/connected mode neighbor cell lists of the femto cells to enable that the user equipment 10 performs the needed measurements in the embodiment addressing interference reduction between femto cells.

Additional measures are needed to enable, or more correctly to increase the likelihood, that a femto cell is identified correctly by the Serving RNC. Soft Handover between Femto radio base stations is not easy to achieve. One solution would require a dynamic building of user equipment-specific neighbor cell lists, and that these lists are built based on subscriber specific information. This information is not available in the (Femto) RNC and would require interaction with a database function in real time. This means that such a function would mean substantial impact. A similar function to enable handover from macro to femto is described in U.S. Ser. No. 11/380,824, Title: DYNAMIC BUILDING OF MONITORED SET and could be used to achieve also Soft Handover between femto cells.

As mentioned, the lack of soft handover will increase the uplink interference towards the neighboring macro or femto cell, indicating a possible need to implement some special uplink interference mitigation technique into the Femto radio base station. Such techniques include for example limitation of the user equipment transmission power, and the limitation of the size of the femto cell e.g. by changing the handover parameter settings or by reducing the femto P-CPICH transmission power. The downside of the first technique is the reduced performance of the user equipments in the femto cell, while the downside of the second alternative is the reduced femto coverage area, as well as the increased uplink interference towards the Femto radio base station from close-by macro user equipments. The presented solution introduces an enhancement to the first alternative, i.e. the limitation of the maximum transmission power of the user equipment in the femto cell.

The assumed scenarios are applied for WCDMA Femto and deployment CDS3, but may also apply for LTE Femto, other RATs and other channel deployment scenarios.

For GSM Femto solutions the interference problem could most likely be avoided by good carrier allocation policy. However, if dedicated frequencies cannot be allocated for the femto layer, interference may apply.

Figure 3:
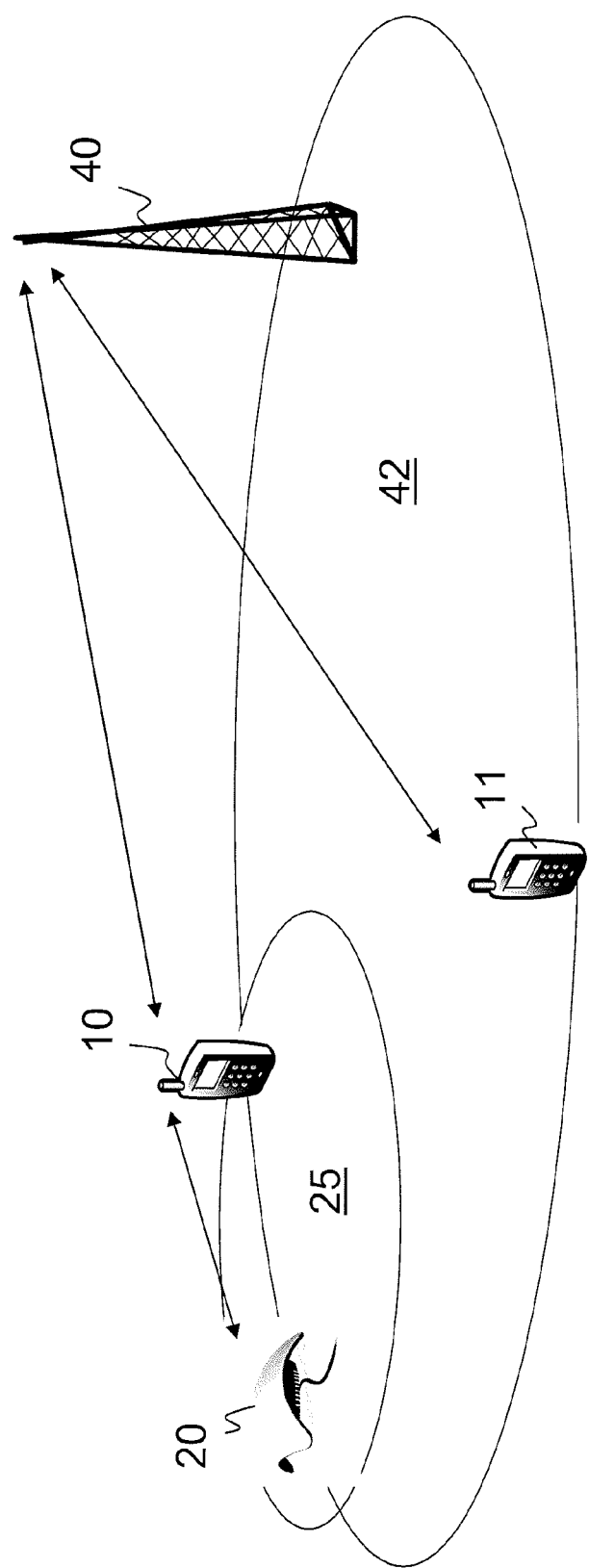
FIG. 3 is a schematic overview of a radio communications network comprising a Femto radio base station and a macro radio base station.

FIG. 3 shows a schematic overview of a radio communications network. The radio communications network comprises the radio base station 40 serving the macro cell 42 with a user equipment 11. In the illustrated example, the Femto radio base station 20 serves the user equipment 10 within the femto cell 25. As the Femto radio base station 20 uses the same frequency as the radio base station 40 there is a risk that the user equipment 10 will interfere with the radio base station 40 serving the overlaying macro cell 42 when transmitting with a high transmission power. In the illustrated example, the Femto radio base station 20 will order the user equipment 10 to a maximum allowed user equipment transmission power based on measurements from the user equipment 10, which provide means to calculate an estimated pathloss. Hence, the user equipment 10 will operate using the ordered transmission power and the UL interference will be reduced. The maximum allowed user equipment transmission power may also be based on estimated pathloss measured and calculated at the Femto radio base station 20 of a signal from the radio base station 40.

The basic idea with the solution described in embodiments is to provide means and procedures to minimize the uplink interference towards neighboring radio base stations or cells by regulating the maximum allowed femto user equipment transmission power.

An object of some embodiments is to let the Femto radio base station 20 estimate pathlosses to a neighboring radio base station, in the illustrated example radio base station 40. Then, the Femto radio base station 20 calculates a maximum allowed user equipment transmission power to be used in that femto cell. This is signaled to the user equipment 10 within the femto cell. The maximum allowed user equipment transmission power may be signaled as an indication, a value, a level, and/or the like.

The detailed description is made for a WCDMA embodiment but may be implemented in other radio communications network such as LTE or the like.

Figure 4:
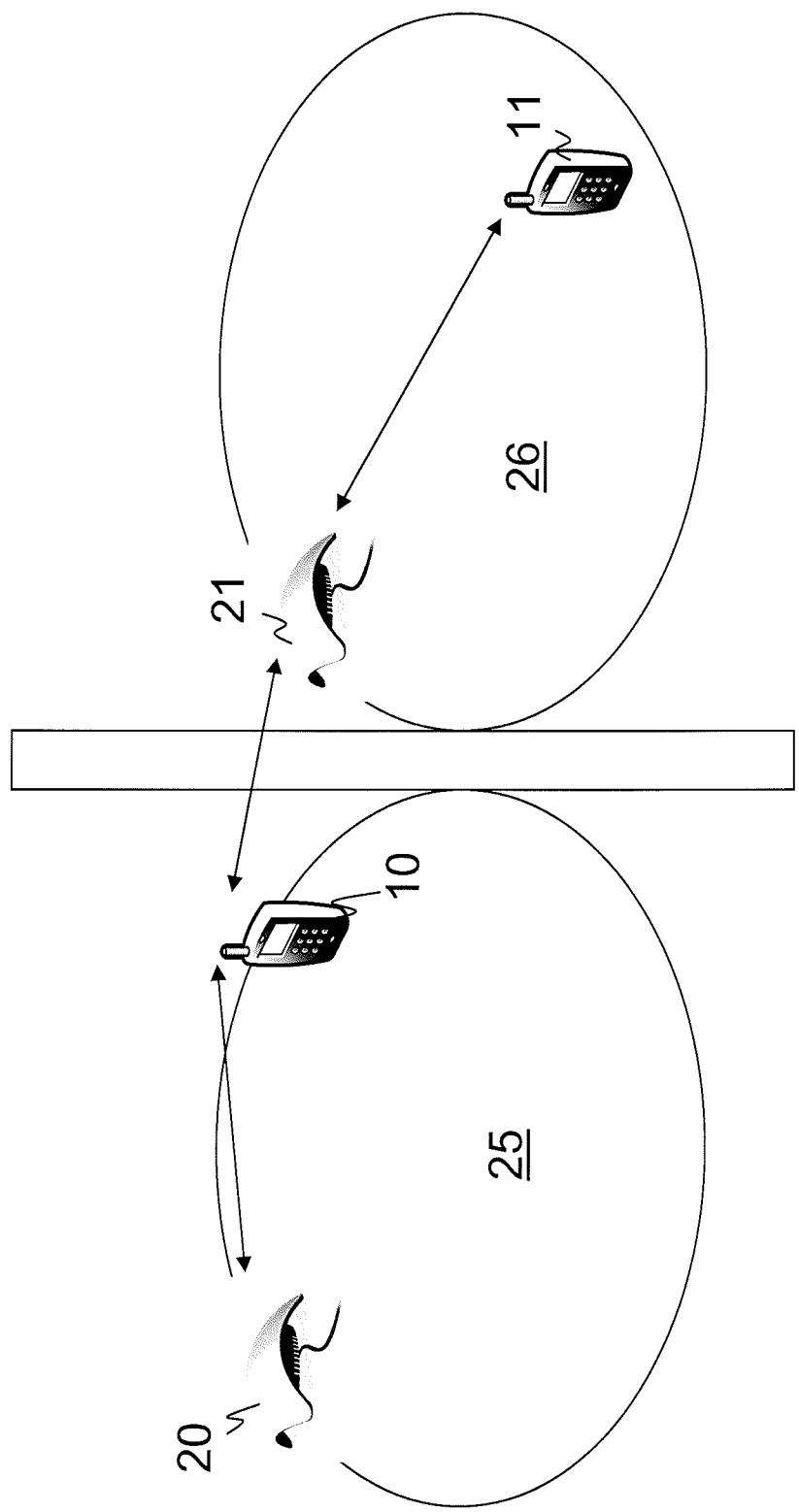
FIG. 4 is a schematic overview of a radio communications network comprising a first Femto radio base station and a second Femto radio base station.

FIG. 4 shows a schematic overview of a scenario in which the user equipment 10 is served in the first cell 25 by the Femto radio base station 20 and may be interfering with a neighboring Femto radio base station 21. The neighboring Femto radio base station 21 serves the user equipment 11 in a second cell 26, which user equipment 10 may interfere with the user equipment 11 in the uplink to the neighboring Femto radio base station 21. In the illustrated example, the Femto radio base station 20 will order the user equipment 10 to a maximum allowed user equipment transmission power based on at least one report from the user equipment 10. The report indicates a measured signal power of a signal from the neighboring Femto radio base station 21, which provides means to calculate an estimated pathloss. The maximum allowed user equipment transmission power may be based on the estimated pathloss. Hence, the user equipment 10 will operate limiting the maximum transmission power not to exceed the ordered maximum allowed user equipment transmission power and the UL interference will be reduced. It should be understood that the maximum allowed user equipment transmission power may also be based on an estimated pathloss, which pathloss is measured and estimated locally at the Femto radio base station 20 as described below.

Figure 5:
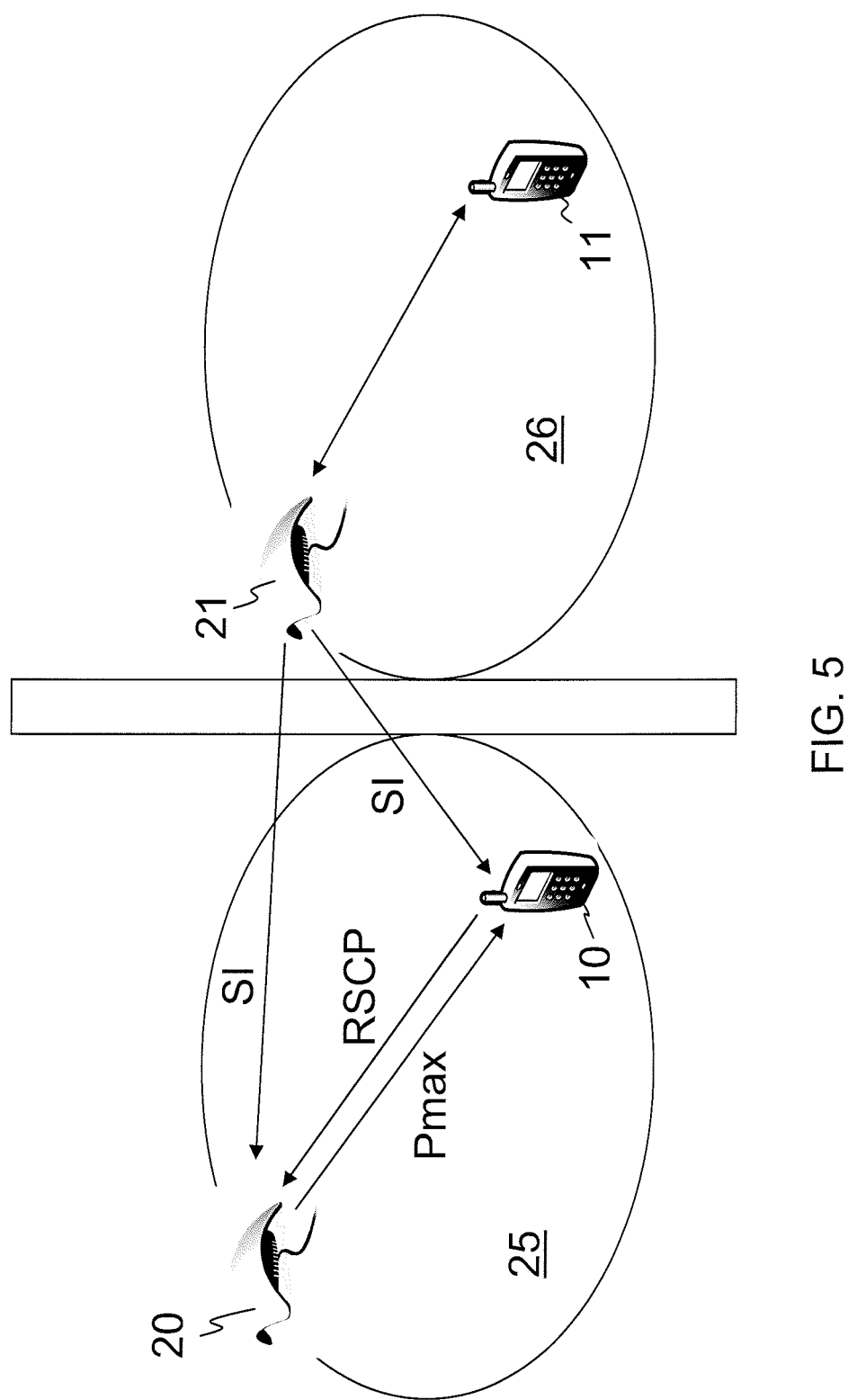
FIG. 5 is a schematic overview of a radio communications network comprising a first Femto radio base station and a second Femto radio base station.

FIG. 5 shows a schematic overview of a radio communications network wherein the user equipment 10 in the femto cell 25 of the Femto radio base station 20, in this example denoted as the first Femto radio base station, may interfere with the Femto radio base station 21, in this example denoted as the second Femto radio base station. The user equipment 11 is served in the femto cell 26 of the second Femto radio base station 21. An exemplary method for efficiently tuning in a level of maximum allowed user equipment transmission power of the user equipment 10 is disclosed. The first Femto radio base station 20 is turned on and starts scanning its surroundings. The first Femto radio base station 20 detects a System Information (SI) transmission from the second Femto radio base station 21. The SI indicates a transmission power of a Primary Common Pilot Channel (P-CPICH) of the second radio base station 21. The first Femto radio base station 20 then measures a received signal code power (RSCP) on a transmission on the P-CPICH from the second Femto radio base station 21. The P-CPICH is a separate physical channel compared to the physical channel where the SI is transmitted. The first Femto radio base station 20 compares the measured RSCP to the indicated transmission power in the SI and calculates UL pathloss based on the comparison. An example of a calculation is described below in FIG. 6. The first Femto radio base station 20 then orders the user equipment 10 to limit a maximum allowed user equipment transmission power Pmax based on the calculated UL pathloss.

Moreover, the user equipment 10 also scans its surroundings. The user equipment 10 detects a P-CPICH transmission from the second Femto radio base station 21 and measures RSCP of the P-CPICH transmission. The user equipment 10 then transmits the measured RSCP to the first Femto radio base station 20. Thus, in order to fine tune the maximum transmission power, the Femto radio base station 20 receives RSCP measurements from the user equipment 10 to be used to estimate UL pathloss and consequently the maximum allowed user equipment transmission power for the user equipment 10. In case of LTE the Femto radio station 20 measures the reference symbol received power (RSRP) and compares that to the detected information about the RS transmission power.

It should here be noted that the user equipment 10 may, in some alternative embodiments, receive a SI transmission from the neighboring second Femto radio base station 21. The SI, as stated above, indicates the transmission power of the P-CPICH from the second Femto radio base station 21. Hence, the user equipment 10 may calculate the UL pathloss from the transmission power and the measured RSCP and send the UL pathloss to the first Femto radio base station 20.

Figure 6:
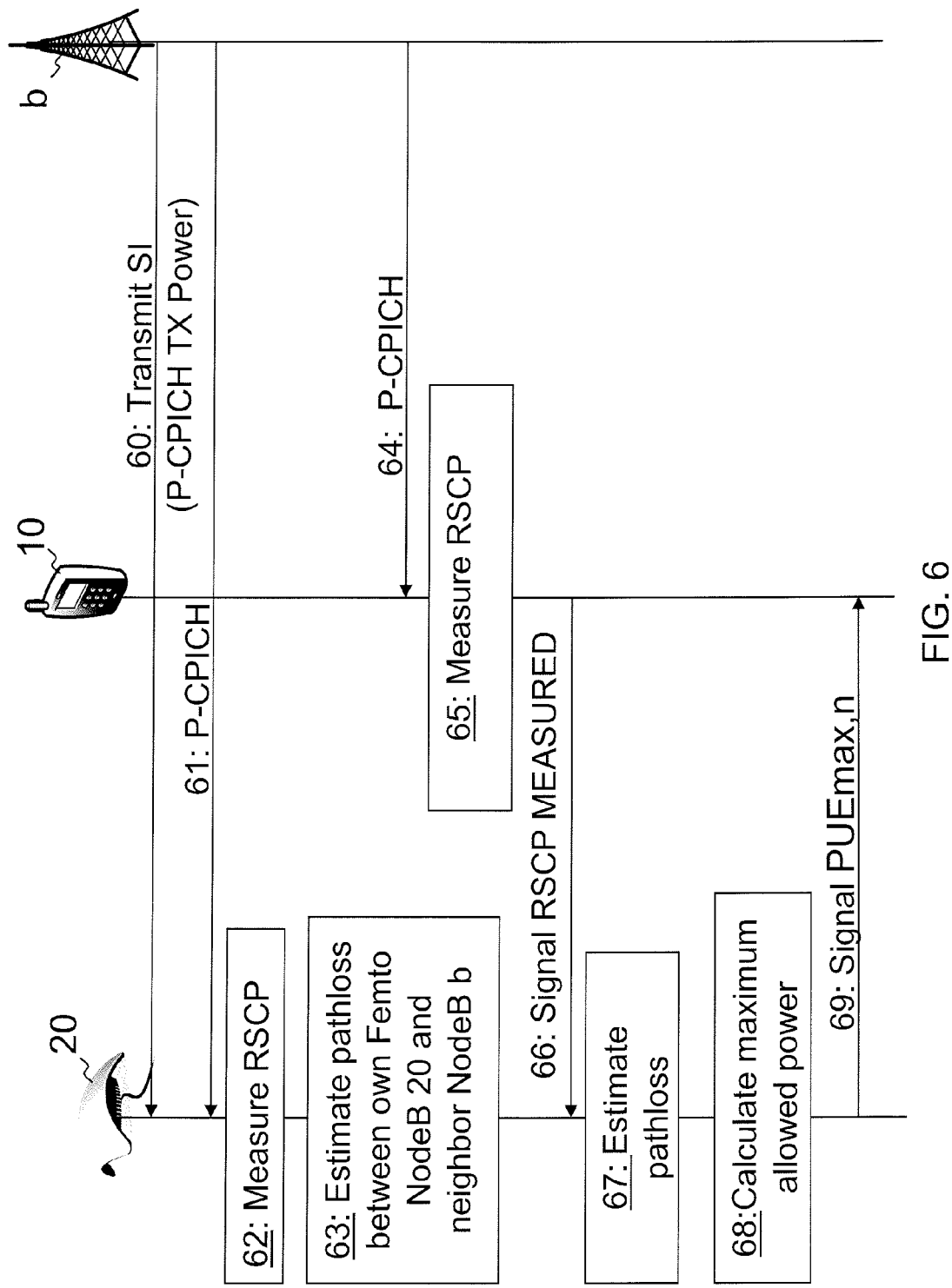
FIG. 6 is a schematic diagram of a combined signalling and flowchart in a radio communications network.

FIG. 6 is a schematic diagram depicting embodiments of a combined flow and signaling scheme in a radio communications network. In the illustrated embodiment, the interference towards a neighboring radio base station b, denoted in FIG. 6 as NodeB b, is controlled by limiting the maximum allowed user equipment transmission power of the user equipment 10. The basic idea is to limit the maximum allowed user equipment transmission power to a level, where the resulting uplink interference at the neighboring radio base station b does not exceed a pre-defined threshold. For example, when the radio base station b cannot be included in an active set of the user equipment 10 and a soft handover may not be performed.

Initially the Femto radio base station 20 is switched on and typically performs an initial network scanning, for example, in order to detect a suitable carrier frequency, and scrambling code. Furthermore, the Femto radio base station 20 is assumed to use the scanning function to generate a list of neighboring radio base stations.

As part of this scanning phase, step 60, the Femto radio base station 20 may also read the "P-CPICH TX power" information of system information (SI) transmitted from the detected neighboring radio base station b.

In step 61, the Femto radio base station 20 receives a P-CPICH transmission from the radio base station b.

In step 62, the Femto radio base station 20 measures RSCP of the P-CPICH transmission from the radio base station b.

In step 63, the Femto radio base station 20 estimates pathloss between the Femto radio base station 20 and the neighboring radio base station b. The Femto radio base station 20 may use the "P-CPICH TX power" information, together with the measured RSCP from the same radio base station b, to obtain a downlink (DL) path loss ($L_{DL}$) towards the neighboring radio base station b.

Hence, Femto radio base station 20 obtains a downlink path loss estimate $L_{DL,b}$ separately for each detected neighboring radio base station b.

In order to estimate the level of uplink interference at the neighboring radio base station b, estimate of the uplink path loss ($L_{UL,b}$) is needed instead of the downlink path loss.

Furthermore, the interference estimate should take the actual channel deployment into account. Therefore, a margin $M_{freq,b}$ is applied on top of the estimated $L_{DL,b}$, taking both the frequency difference between downlink and uplink, as well as the appropriate adjacent channel protection of both user equipment and radio base station b into account, when applicable.

Hence, $$L_{UL,b} \approx L_{DL,b} + M_{freq,b}$$

As a result of the adjacent channel protection $M_{freq,b}$ will differ between neighboring radio base stations 'b's, depending on whether the neighboring radio base station b is operating on the same channel as the Femto radio base station, or on an adjacent channel. For adjacent channel radio base station 'b's, the $M_{freq,b}$ is larger than for co-channel radio base station 'b's.

In step 64, the user equipment 10 receives a P-CPICH transmission from the radio base station b.

In step 65, the user equipment 10 measures the P-CPICH RSCP from the radio base station b.

In step 66, the user equipment 10 transmits the result of the measured RSCP to the Femto radio base station 20.

For a reliable uplink interference estimate, estimates of the pathlosses between the user equipment 10 and the neighboring radio base stations b are needed. Due to different locations, the RSCP values measured by the Femto radio base station 20 may differ from the RSCP values measured by the user equipment 10.

During the initial set-up (time instant n=0), the Femto radio base station 20 may assume that $$\hat{L}_{UL,b,0} \approx \hat{L}_{DL,b,0} + M_{freq,b}$$

and $$\hat{L}_{DL,b,0} \approx L_{DL,b} + M_{BS2UE}$$

where the initial margin ($M_{BS2UE}$) may, for example, be preset by the operator.

In step 67, the Femto radio base station 20 estimates the pathloss between the user equipment 10 and neighbor radio base station b. During the femto cell operation, that is, time instant n>0, based on the received measurement reports from the served user equipment 10, Femto radio base station 20 may adjust the $\hat{L}_{DL,b,n}$ value to fit better to the actual femto deployment. This adjustment can be done as follows:

Femto radio base station 20 monitors the RSCP measurement reports received from all served user equipments.

Assuming that $RSCP_{m,b}$ is the RSCP from neighboring radio base station b measured by user equipment m, Femto radio base station 20 can easily derive the corresponding downlink path loss $L_{DL,m,b}$, assuming that it has also information of the P-CPICH transmission power at radio base station b. There are at least a couple different ways to obtain this information:

Femto radio base station 20 may be able to read the signaled "P-CPICH TX power" from the neighboring radio base station b broadcasted system information. This is of course the preferred alternative for all radio base station 'b's, which the Femto radio base station 20 is able to detect during the scanning.

If Femto radio base station 20 is not able to read the system information for a certain radio base station, which the Femto user equipment 10 reports as a neighbor, it may have to assume a likely value for the "P-CPICH TX power". For example, if the neighboring radio base station b is a Femto radio station, which for example could be determined based on the used PSC, the P-CPICH TX power can be assumed to be the same as for the serving Femto radio base station 20.

Femto radio base station 20 collects pathloss statistics for each neighboring radio base station b considering the $L_{DL,m,b}$ values. In order to more efficiently collect the statistics, Femto radio base station 20 may, from time to time, order the served user equipments 10 to initiate periodical measurement reporting of RSCP instead of the normal event-triggered measurement reporting.

The appropriate $\hat{L}_{DL,b,n}$ value is then obtained from the $L_{DL,m,b}$ distribution, assuming the wanted probability for a scenario where $L_{DL,m,b} < \hat{L}_{DL,b}$.

In order to have a smoother transition between time instants n, Femto radio station 20 can for example assume that $\hat{L}_{DL,b,n} = (1-\alpha) \cdot \hat{L}_{DL,b,n-1} + \alpha \cdot \hat{L}_{DL,b}$, where $\hat{L}_{DL,b}$ is the pathloss obtained from the $L_{DL,m,b}$ distribution at time instant n. The filtering parameter a can for example be set by the operator. Thereby, the downlink pathloss will be a smooth transition between a previous pathloss value and a latest pathloss value.

In step 68, the Femto radio base station 20 calculates the maximum allowed user equipment transmission power of the user equipment 10. The interference threshold $R_b$ allowed to a neighbor radio base station b may be derived either from a simple received power level $P_{Rx,b}$, noise rise $NR_{F,b}$ or sensitivity degradation $\Delta_{Sens,b}$. In the simplest form of implementation, the same uplink interference threshold is applied to all neighbor radio base stations. However, depending on the receiver sensitivity of a particular neighboring radio base station, a certain received interference power can have a different impact on the uplink performance. Typically, a macro radio base station with good receiver sensitivity is much more sensitive to any additional uplink interference compared to a Femto radio station with worse receiver sensitivity. In order to take also this aspect into account, the network could estimate the uplink sensitivity degradation caused by the user equipment 10 at radio base station b instead of the plain uplink interference power. In order to calculate the sensitivity degradation, knowledge of the radio base station b receiver sensitivity is required. In addition to the unloaded receiver sensitivity, this information may, for example, also be an indication of the typical receiver noise figure or uplink interference level of the radio base station b. In addition, the value of Rb may also vary depending on whether soft handover is allowed between the serving Femto radio base station 20 and neighboring radio base station b. Typically, a lower Rb is allowed for neighboring radio base stations, where soft handover is not allowed.

Assuming that the received interference power at the neighboring radio base station b should not exceed $R_b$, in dBm, the maximum allowed Femto user equipment transmission power in dBm towards neighboring radio base station b can be calculated as $$P_{UEmax,b,n} = \hat{L}_{UL,b,n} + R_b$$

In case of multiple neighboring radio base stations, the maximum allowed Femto user equipment transmission power ($P_{UEmax,n}$) applied for the femto cell is the minimum over all $P_{UEmax,b,n}$.

In step 69, the Femto radio base station 20 signals the maximum power to the user equipment 10. When the Femto radio base station 20 has obtained an estimate of $P_{UEmax,n}$, it then signals the $P_{UEmax,n}$ to the served user equipment 10 via, for example, RRC physical channel reconfiguration or indirectly via "Access grant" messages. The $P_{UEmax,n}$ may be a value, an indication, an estimate, a range or the like.

Consequently, it will be possible to minimize uplink interference from user equipments towards neighboring cells. Embodiments may propose a two-step approach to limit the uplink interference: 1) initial set-up of maximum allowed user equipment transmission power based only on measurements performed by the Femto radio base station 20, and 2) fine-tuning of the maximum allowed user equipment transmission power during the femto cell operation with the help of measurement reports received from the served user equipment 10. As a result of the fine-tuning step, the algorithm adapts to actual femto deployment scenario, and hence, minimizes a) interference towards neighboring cells and b) unnecessary impact on Femto user equipment uplink performance. The present solution also applies for the scenarios, where the Femto radio base station cannot detect all neighboring radio base stations. It should also be noted that the steps may be performed separately. For example, in some embodiments, a rough estimate of the UL pathloss may be estimated based on the measurements performed in the Femto radio base station 20. In addition, in some embodiments, estimate of the UL pathloss may be estimated based on the measurements performed in the user equipment 10, and reported to the Femto radio base station 20

Figure 7:
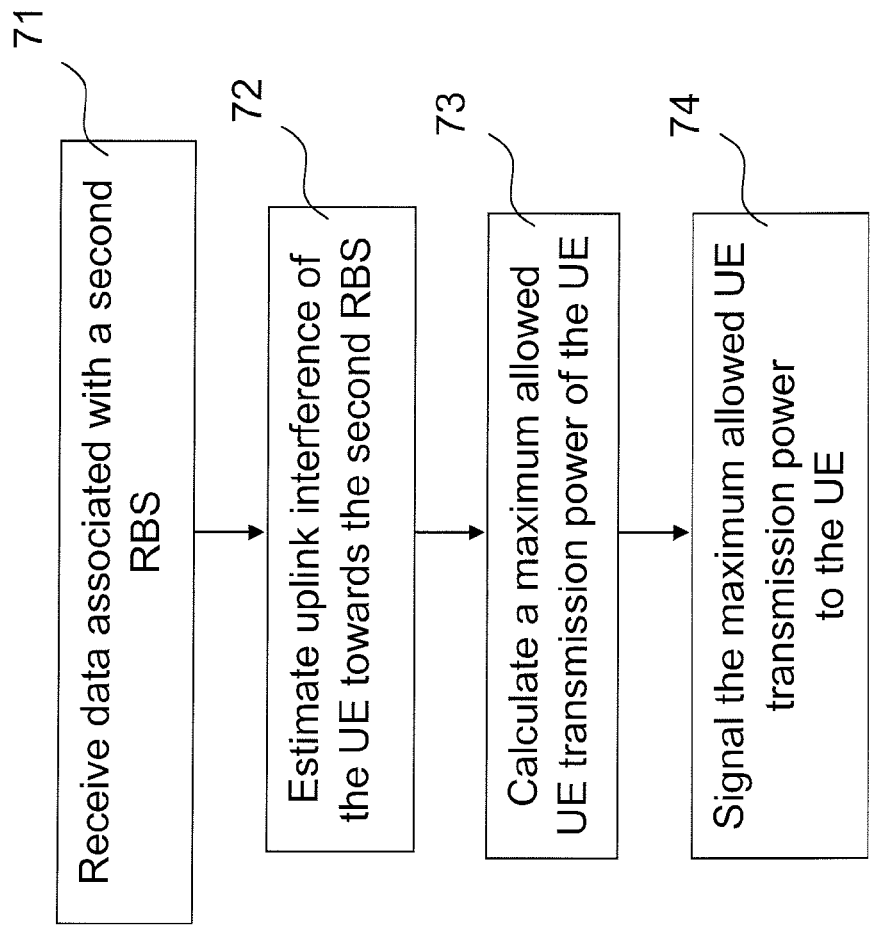
FIG. 7 is a schematic block diagram depicting a method in a radio base station.

FIG. 7 is a schematic block diagram depicting a general embodiment of a method in the first radio base station 20, denoted above as the Femto radio base station but may also be a macro cell. The method is for decreasing interference of the user equipment 10 present in the first cell 25 towards the second radio base station 21,40,140. The first radio base station 20 and the second radio base station 21,40,140 are comprised in a radio communications network and the first radio base station 20 serves the first cell 25 and the second radio base station 21,40,140 serves a second cell 26,42,142.

Step 71

The first radio base station 20 receives data, which data is associated with the second cell 26. This data may comprise a P-CPICH transmission from the second radio base station 21,40,140 or a measured RSCP of the P-CPICH from the user equipment 10.

Step 72

The first radio base station 20 estimates uplink interference of the user equipment 10 towards the second radio base station 21,40,140 based on the received data.

Step 73

The first radio base station 20 calculates a maximum allowed user equipment transmission power of the user equipment 10 from the estimated uplink interference.

Step 74

The first radio base station 20 signals the maximum allowed user equipment transmission power to the user equipment 10. The maximum allowed user equipment transmission power limits a transmission power used by the user equipment 10. Thereby, the interference of the user equipment 10 towards the second radio base station 21,40,140 is reduced.

Figure 8:
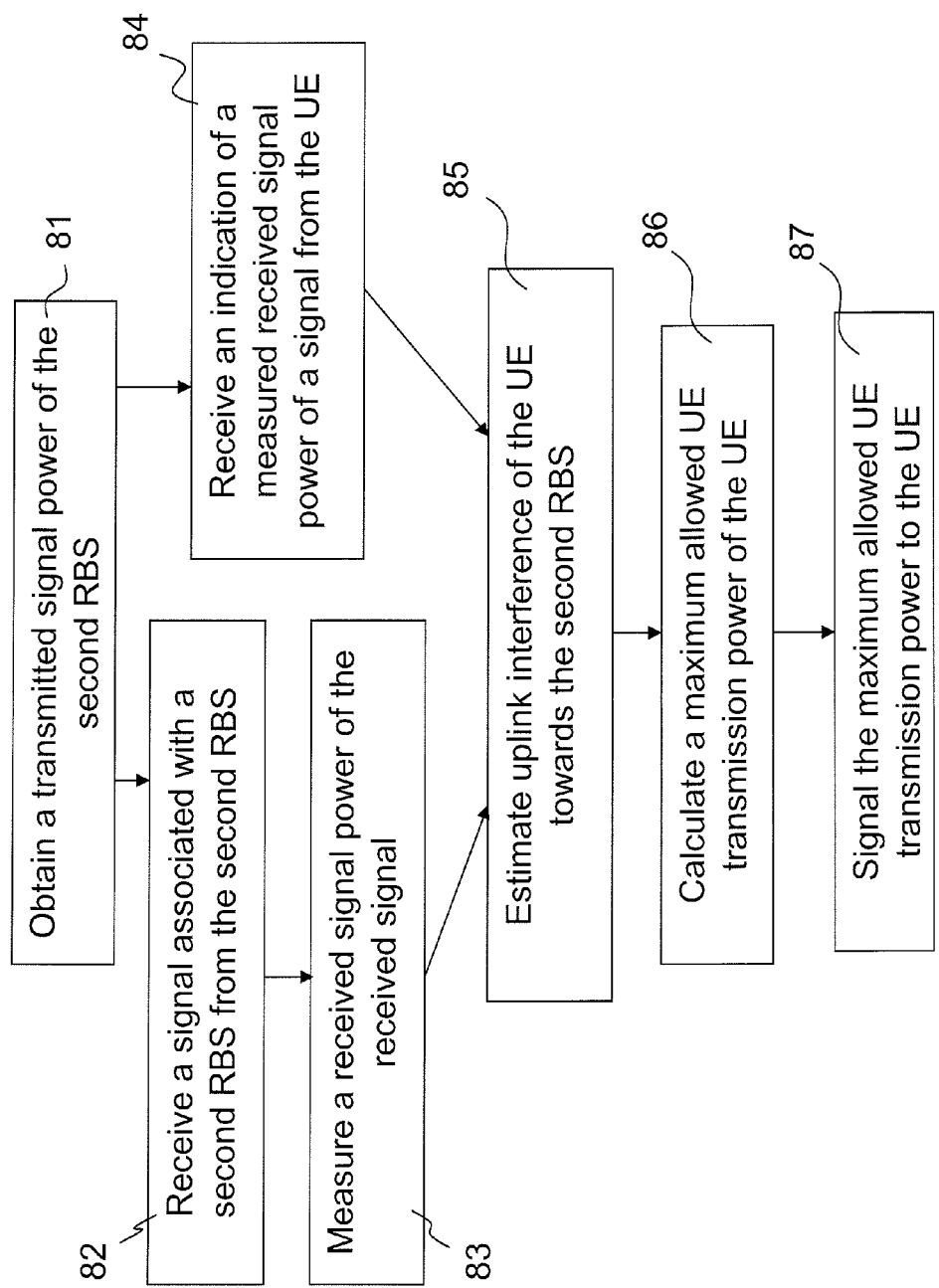
FIG. 8 is a schematic block diagram depicting further embodiments of the method.

FIG. 8 is a schematic block diagram depicting further embodiments of a method in a first radio base station. The first radio base station may comprise a Femto radio base station and the second radio base station 21, 40 may be represented by a Femto radio base station or a macro radio base station. The method is, as stated above, for decreasing interference of the user equipment 10 present in the first cell 25 towards the second radio base station 21,40,140. The first radio base station 20 and the second radio base station 21,40,140 are comprised in a radio communications network and the first radio base station 20 serves the first cell 25 and the second radio base station 21,40,140 serves a second cell 26,42,142. The steps may be performed in any suitable order.

Step 81

This is an optional step. The first radio base station 20 obtains a transmitted signal power of a signal from the second radio base station 21,40,140. This transmitted signal power may be obtained from a broadcasted system information signal from the second radio base station 21, 40, or obtained from a value being stored in the first radio base station 20.

Step 82

This is an optional step. The first radio base station 20 receives the signal from the second radio base station 21,40, 140. The signal may be a broadcasted pilot channel transmission, such as a P-CPICH transmission or the like.

Step 83

This is an optional step. The first radio base station 20 measures a received signal power of the received signal.

Step 84

This is an optional step that may be performed as an alternative to step 82 and 83 or as a complement step as explained below. The first radio base station 20 receives, from the user equipment 10, an indication of a measured received signal power of the signal transmitted from the second radio base station 21,40,140 to the user equipment 10.

Step 85

The first radio base station 20 estimates the uplink interference based on the measured received signal power or the received indication from the user equipment 10. It should be understood that the estimation of the uplink interference may be based on a downlink pathloss calculated from the measured received signal power or the received indication in relation to the obtained transmitted signal power. In some embodiments, the step of receiving 84 the data comprises to receive, from the user equipment 10, an indication of estimated downlink pathloss of a signal. The signal is transmitted from the second radio base station 21, and the step of estimating 85 the uplink interference is based on the received downlink pathloss.

In some embodiments, the estimated uplink interference is based on an uplink pathloss calculated from the calculated downlink pathloss and an extra parameter. The extra parameter may be based on the frequency difference between uplink and downlink. Also, whether the first radio base station 20 and the second radio base station 21,40,140 are operating on the same channel or on an adjacent channel. The estimation may be the lower bound, Xth percentile, of the path losses between the user equipment 10 and the second radio base station 21,40,140.

Step 86

The first radio base station 20 calculates a maximum allowed user equipment transmission power of the user equipment 10 based on the estimated uplink interference. The step 86 in FIG. 8 corresponds to the step 73 in FIG. 7.

Step 87

The first radio base station 20 signals the maximum allowed user equipment transmission power to the user equipment 10. The maximum allowed user equipment transmission power limits a transmission power used by the user equipment 10. Thereby, the interference of the user equipment 10 towards the second radio base station 21,40,140 is reduced. The maximum allowed user equipment transmission power may be transmitted as a value, an indication, an estimate or the like. The step 87 in FIG. 8 corresponds to the step 74 in FIG. 7.

It should here be noted that the first radio base station 20 may perform a rough estimation procedure performing the steps 81-83, 85-87. The first radio base station 20 may also merely perform a fine tuning procedure performing the steps 81, 84-87. In addition, the first radio base station 20 may, as stated above, perform a rough estimate, steps 81-83, 85-87, at start up followed by a fine tuning, steps 81, 84-87.

As stated above, the second radio base station may be represented by a Femto radio base station 21 or a macro radio base station 40. For example, a radio base station that is not allowed to be in a handover or a soft handover with the first radio base station 20. However, even if the user equipment 10 would be able to be handed over to second cell 26,42,142, there may be scenarios, depending on the handover settings, where the user equipment 10 still connected to the first cell 25 would already be interfering the second cell 26,42,142. The present solution may then be applied to reduce this interference, until the user equipment 10 is handed over to the second cell 26,42,142. The present solution may also apply in case of interference coordination between cells. However, not for scenarios where the second radio base station 21,40,140 is able to control the interfering user equipment 10 directly, such as soft handover The first radio base station 20 may take a generated intercell interference into account when setting/limiting the maximum allowed user equipment transmission power of the user equipment 10. The inter-cell interference coordination (ICIC) may then be used to exchange information between the radio base stations, which the controlling first radio base station 20 may or may not take into account when controlling the user equipment 10. Hence, the present solution is useful for heterogeneous scenarios, such as macro-femto, or scenarios including two neighbouring access controlled Femto radio base stations but also applicable for macro cells as well.

Figure 9:
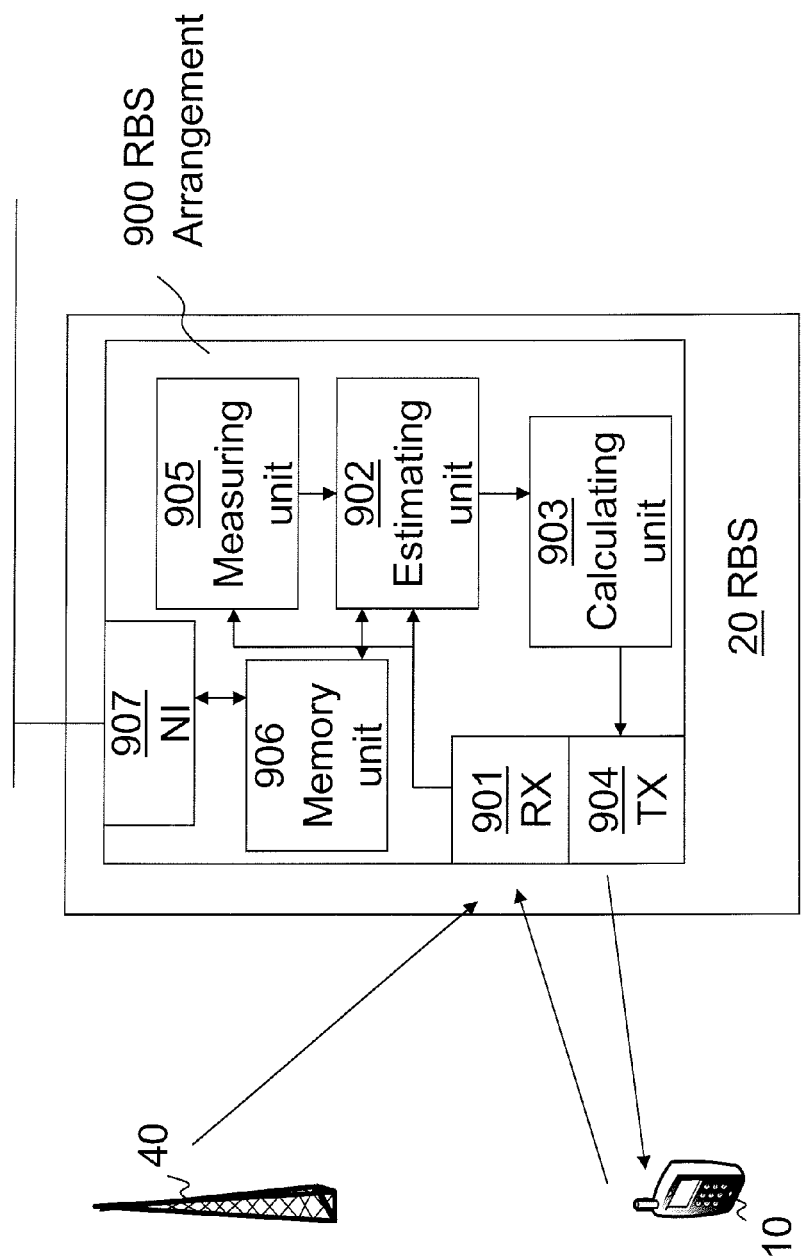
FIG. 9 is a schematic block diagram of a radio base station.

In order to perform the method an arrangement in the first radio base station is provided. FIG. 9 is a schematic block diagram of the arrangement 900 in the first radio base station 20. The arrangement 900 comprises a receiving unit 901 configured to receive data, which data is associated with the second radio base station 21,40,140. The data may be received over the receiving unit 901 from the user equipment 10 or the second radio base station 21,40,140.

Furthermore, the arrangement 900 comprises an estimating unit 902 arranged to estimate uplink interference of the user equipment 10 towards the second radio base station based on the received data. The arrangement 900 also comprises a calculating unit 903 arranged to calculate a maximum allowed user equipment transmission power of the user equipment 10 from the estimated uplink interference. Additionally, the arrangement 900 comprises a signaling unit 904, such as a transmitting antenna arrangement TX, configure to transmit the maximum allowed user equipment transmission power to the user equipment 10. The maximum allowed user equipment transmission power is arranged to limit the transmission power used by the user equipment 10.

The arrangement 900 may comprise a measuring unit 905 arranged to measure a received signal power of the received signal from the second radio base station 21,40,140. Estimating measurements may be performed on a single, multiple, or all frequencies both the same and adjacent frequencies.

It should here be noted that the estimating unit may be arranged to obtain a signal transmission power of a signal from the second radio base station 21,40,140. The signal transmission power may be received on a system information broadcast or obtained locally at the first radio base station 20.

The estimating unit 902, calculating unit 903, and measuring unit 905 may be arranged in a single processing unit, a plurality of processing units, and or the like.

The arrangement 900 in the first radio base station 20 may further comprise a memory unit 906 arranged to store data to be used in the method and/or applications to be executed in the arrangement units to perform the method. The data stored thereon may comprise transmission power value for the obtaining unit 909 to obtain the transmission power of the signal. Also, the arrangement 900 may comprise a network interface NI 907 configured to connected the first radio base station 20 with the core network.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a first radio base station for decreasing interference of a user equipment present in a first cell towards a second radio base station, wherein the first radio base station and the second radio base station are comprised in a radio communications network and wherein the first radio base station serves the first cell and wherein the second radio base station serves a second cell, the method comprising:
receiving data associated with the second radio base station, the data indicating a pathloss between the user equipment and the second radio base station;
estimating an uplink interference of the user equipment towards the second radio base station based on the received data;
calculating a maximum allowed user equipment transmission power of the user equipment based on a lower bound of the estimated uplink interference of the user equipment; and
signalling the maximum allowed user equipment transmission power to the user equipment in the cell, wherein the maximum allowed user equipment transmission power limits a transmission power used by the user equipment.

2. A method according to claim 1, wherein receiving the data comprises receiving a signal from the second radio base station and the method further comprising:
measuring a received signal power of the received signal, and wherein estimating the uplink interference is based on the measured received signal power.

3. A method according to claim 1, wherein receiving the data comprises receiving, from the user equipment, an indication of a measured received signal power of a signal, wherein the signal is transmitted from the second radio base station to the user equipment, and wherein estimating the uplink interference is based on the received indication of the user equipment.

4. A method according to the claim 2, further comprising:
obtaining a transmitted signal power of the signal from the second radio base station, and wherein estimating the uplink interference is based on a downlink pathloss calculated from the measured received signal power or the received indication in relation to the obtained transmitted signal power.

5. A method according to claim 4, wherein the transmitted signal power is obtained from a system information signal broadcast from the second radio base station.

6. A method according to claim 4, wherein the transmitted signal power is obtained from a stored value within the first radio base station.

7. A method according to claim 1, wherein the pathloss comprises a downlink pathloss, and wherein estimating the uplink interference comprises calculating an uplink pathloss from the downlink pathloss and an extra parameter.

8. A method according to claim 7, wherein the extra parameter is based on a frequency difference between uplink and downlink and whether the first radio base station and the second radio base station are operating on the same channel or on an adjacent channel.

9. A method according to claim 4, wherein the signal comprises a broadcasted pilot channel transmission.

10. A method according to claim 1, wherein the first radio base station comprises a femto radio base station.

11. A method according to claim 1, wherein the second radio base station comprises a femto radio base station.

12. A method according to claim 1, wherein the second radio base station comprises a radio base station serving a macro cell.

13. A method according to claim 1, wherein receiving the data comprises receiving, from the user equipment, an indication of estimated downlink pathloss of a signal, wherein the signal is transmitted from the second radio base station, and wherein estimating the uplink interference is based on the received indication of the estimated downlink pathloss.

14. A method according to claim 1, wherein the first radio base station initially when powered on measures a received signal power of a signal received from the second radio base station and estimates the uplink interference based on the measured received signal power, and then to fine tune the maximum allowed user equipment transmission power receives from the user equipment an indication of a measured received signal power of a signal transmitted from the second radio base station to the user equipment, and estimates the uplink interference based on the received indication.

15. An arrangement in a first radio base station for decreasing interference of a user equipment present in a first cell towards a second radio base station, wherein the first radio base station and the second radio base station are comprised in a radio communications network and the first radio base station serves the first cell and the second radio base station serves a second cell, comprising:
    a receiving unit configured to receive data associated with the second radio base station, the data indicating a pathloss between the user equipment and the second radio base station;
    an estimating unit configured to estimate an uplink interference of user equipment towards the second radio base station based on the received data;
    a calculating unit configured to calculate a maximum allowed user equipment transmission power of the user equipment based on a lower bound of the estimated uplink interference of the user equipment; and
    a signalling unit configured to signal the maximum allowed user equipment transmission power to the user equipment, wherein the maximum allowed user equipment transmission power is arranged to limit a transmission power used by the user equipment.

16. A method according to claim 1, wherein the lower bound comprises a percentile of a downlink pathloss between the user equipment and the second radio base station.

17. An arrangement according to claim 15, wherein the pathloss comprises a downlink pathloss, and wherein the estimating unit is configured to estimate the uplink interference by calculating an uplink pathloss from the downlink pathloss and an extra parameter.

18. An arrangement according to claim 17, wherein the extra parameter is based on a frequency difference between uplink and downlink and whether the first radio base station and the second radio base station are operating on the same channel or on an adjacent channel.

\* \* \* \* \*

UNITED STATES PATENT AND TRADEMARK OFFICE
CERTIFICATE OF CORRECTION

PATENT NO. : 8,515,353 B2
APPLICATION NO. : 13/120094
DATED : August 20, 2013
INVENTOR(S) : Hiltunen et al.

Page 1 of 1

It is certified that error appears in the above-identified patent and that said Letters Patent is hereby corrected as shown below:

On the Title Page, Item (75), under "Inventors", in Column 1, Line 2, delete "Varmdo (SE);" and insert -- Värmdö (SE); --, therefor.

On the Title Page, Item (75), under "Inventors", in Column 1, Line 4, delete "Jarna (SE)" and insert -- Järna (SE) --, therefor.

In the Specification

In Column 10, Line 18, delete "a" and insert -- α --, therefor.

Signed and Sealed this
Eleventh Day of February, 2014

Michelle K. Lee
*Deputy Director of the United States Patent and Trademark Office*